US008943188B2

(12) United States Patent  
Büsgen et al.

(10) Patent No.: US 8,943,188 B2
(45) Date of Patent: Jan. 27, 2015

(54) AUTOMATION NETWORK COMPRISING NETWORK COMPONENTS THAT PRODUCE STATUS MESSAGES

(75) Inventors: Ralph Büsgen, Großenseebach (DE); Karl Glas, Herzogenaurach (DE); Michael Kasper, Nürnberg (DE); Joachim Koppers, Forchheim (DE); Andreas Köpke, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 2309 days.

(21) Appl. No.: 11/547,942

(22) PCT Filed: Apr. 8, 2005

(86) PCT No.: PCT/EP2005/003738
§ 371 (c)(1),
(2), (4) Date: Apr. 16, 2009

(87) PCT Pub. No.: WO2005/098559
PCT Pub. Date: Oct. 20, 2005

(65) Prior Publication Data
US 2009/0204695 A1    Aug. 13, 2009

(30) Foreign Application Priority Data

Apr. 8, 2004  (DE) .......................... 10 2004 017 529

(51) Int. Cl.
*G06F 15/173* (2006.01)
*G05B 19/418* (2006.01)
(Continued)

(52) U.S. Cl.
CPC .. *G05B 19/4185* (2013.01); *G05B 2219/31131* (2013.01); *H04L 12/5835* (2013.01);
(Continued)

(58) Field of Classification Search
CPC ............. G05B 2219/31131; H04L 2012/6435; H04L 12/5835

USPC ......................................................... 709/224
See application file for complete search history.

(56) References Cited

U.S. PATENT DOCUMENTS 6,728,262 B1    4/2004  Woram
7,185,045 B2 *  2/2007  Ellis et al. ..................... 709/200
(Continued)

FOREIGN PATENT DOCUMENTS

EP    0 965 897 A1    12/1999
WO    WO 97/05703 A2    2/1997
WO    WO 01/67196 A1    9/2001

OTHER PUBLICATIONS (No stated author); PROFIBUS DP Communication, 2004; Retrieved from the Internet <URL: support.automation.siemens.com/dnl/ TMzNjk2NzMA__18847114__Akt/840Di__Manual__03__2004__76. pdf>; pp. 1-26 as printed.*
Georg Färber, "Feldbus-Technik heute und morgen", atp-Automatisierungstechnische Praxis, Nov. 1994, p. 16-36.

*Primary Examiner* — Michael Chao

(57) ABSTRACT

The invention relates to an automation network and to automation equipment, network components and field devices for an automation network of this type. The network components transmit messages concerning their status to the automation equipment by means of a communication mechanism that functions according to field communication automation technology. Said automation equipment receives the status messages, evaluates them, monitors the operation of the network and controls said operation using the status messages. As the automation equipment thus contains the complete picture of the process and the network, it can react directly and rapidly to problems of the network. This eliminates the need, for example, for an additional SNMP/OPC server or a network management station.

5 Claims, 2 Drawing Sheets

(51) Int. Cl.
*H04L 12/58* (2006.01)
*H04L 12/64* (2006.01)

(52) U.S. Cl.
CPC .................. *H04L2012/6435* (2013.01); *G05B 2219/31134* (2013.01); *G05B 2219/31434* (2013.01); *G05B 2219/31452* (2013.01)
USPC ........................................................ 709/224

(56) References Cited

U.S. PATENT DOCUMENTS

| | | | | |
|---|---|---|---|---|
| 7,246,193 B2 * | 7/2007 | Rotvold et al. | ............... | 710/311 |
| 2002/0116486 A1 | 8/2002 | Toure et al. | | |
| 2002/0194365 A1 * | 12/2002 | Jammes | ....................... | 209/237 |

* cited by examiner

AUTOMATION NETWORK COMPRISING NETWORK COMPONENTS THAT PRODUCE STATUS MESSAGES

CROSS REFERENCE TO RELATED APPLICATIONS

This application is the US National Stage of International Application No. PCT/EP2005/003738, filed Apr. 8, 2005 and claims the benefits of German Patent application No. 10 2004 017 529.2 filed Apr. 8, 2004. All of the applications are incorporated by reference herein in their entirety.

FIELD OF THE INVENTION

The invention relates to an automation network with at least one automation equipment, which is interconnected with at least one field device via at least one network component.

BACKGROUND OF THE INVENTION

The term automation equipment is understood to mean a device that runs a control program for influencing a process that has to be controlled. Equipments of this type are frequently referred to as SPC (Stored-Program Control), PLC (Programmable Logic Controller or just Controller for short), Soft SPC or Soft PLC. An automation equipment can be constructed in a modular manner and contain a programmable central processing unit and also intelligent modules, which take over individual automation functions such as weighing, axis control, regulation, etc. For the purposes of connection to a network, which is used for exchanging data with further components of an automation network, for example network components or field devices, an additional module, which is referred to as a communication processor, can be provided.

The term field device refers to a device that can be arranged locally in the field, that is to say in an automation network in the vicinity of the process that has to be controlled, and that performs functions for capturing process variables and/or influencing the process. Devices of this type are frequently also referred to as measurement transducer, sensor, positioner or actuator. They usually possess facilities for connecting to a network and utilize communication mechanisms from the world of automation for communicating. Examples of communication mechanisms of this type based on Ethernet comprise PROFINET, Ethernet IP, and Modbus TCP. A communication mechanism is defined by means of the associated protocol, which is usually standardized, and the underlying communication relation. Communication relations organize the communication between the devices taking part in the data transmission within the network, which are also referred to as users. Examples of communication relations comprise Client/Server, Master/Slave, Master/Master, Producer/Consumer and Publisher/Subscriber. In the case of Ethernet-based networks, TCP/IP is frequently used as the communication protocol.

The so-called network components are used to construct the network infrastructure. They are transparent to the other components of the automation network, for example to automation equipments and field devices, that is to say messages from said equipments and devices pass through the network components without process-related changes being performed on them. Network components do not exert any influence on the process sequence themselves. Since network components for Ethernet-based networks were initially deployed in the office environment, communication mechanisms from the office environment have been used up to now for monitoring and controlling the network. In the office environment, networks are usually monitored with a network management system. The communication between the network components and a network management station is frequently implemented with SNMP (Simple Network Management Protocol), a protocol that has no relevance to process control and that automation equipments typically do not recognize. This type of monitoring and control of the network therefore runs independently of the process management of the automation equipments. A direct and rapid reaction of an automation equipment to problems in the network is therefore not possible.

A method for monitoring and controlling a network is known from US 2002/0116486 A1 in which a monitoring device with communication mechanisms based on the OPC standard (Object linking and embedding for Process Control) is deployed. This standard is frequently applied in the world of automation for communicating. In a client/server relation, the monitoring device seizes data of other devices that are located in the network and that utilize the SNMP protocol customary in the office environment. As a client, the monitoring device is connected to a gateway that converts the SNMP objects into OPC objects. The method has the disadvantage that the communication between the SNMP server and the OPC client has to run via an additional facility.

SUMMARY OF THE INVENTION

The object underlying the invention is to create an automation network of the type referred to in the introduction and also an automation equipment, a network component, and a field device for an automation network of this type, which enable a rapid reaction to changes in the status of the network.

For the purposes of achieving this object, the novel automation network displays the features of the claims, the novel automation equipment the features of the claims, the novel network component the features of the claims, and the novel field device the feature of the claims.

The invention has the advantage that events and statuses in the automation network that differ from the target status can be identified immediately by means of an automation equipment. The network components are given a communication mechanism that is already customary for field devices, by way of which the messages concerning their status in the network go directly from the network components to the respectively allocated automation equipment. An additional gateway or a computer for the installation of an SNMP/OPC server are no longer required. Since the function of network monitoring and control can now be integrated into the automation equipment, a separate network management station also ceases to be needed. The automation network according to the invention therefore represents a solution to network monitoring and control that is integrated into the automation components that are present anyway and that is extremely cost-effective. It is also user-friendly since communication mechanisms that are known to the automation technician from the field of automation are used. No special knowledge is needed, therefore.

A further advantage can be seen in the fact that the automation equipment contains the complete picture of the process that has to be controlled and the network. The consequence of this is that events in the process and the network can be linked with each other. If a temperature increase and, virtually simultaneously, the failure of a redundant power supply are reported by a field device and by a network component respectively in a switching cabinet, for example, the cause of the power supply failure can be deduced in a simple manner in the automation equipment, specifically the temperature increase in the switching cabinet in which the network component is located. If a further power supply of the network component fails and if a network line located downstream of the network component is therefore no longer accessible, the automation equipment can possibly switch the process control over to a process that does not need the failed components. An increased availability of the automation network is therefore achieved.

Resources customarily present anyway in automation networks, such as an operation and observation station, a servicing device, a programming device or similar can be utilized in an advantageous manner for a display of the network status and where relevant network faults. No additional devices and no additional software are required since communication mechanisms from the world of automation are utilized between the automation equipment and the display device and also between the network component and the display device.

The communication mechanism between the network component and the automation equipment can be constructed in an advantageous manner in accordance with a communication mechanism that functions according to field communication automation technology between a field device and the automation equipment.

In this respect, the integration of network components can be regarded as a new category of field devices with defined uniform properties into the world of automation with the conventions prevailing there.

Field devices are customarily made known to an engineering system via a so-called device master file. The device master file is loaded into the engineering system and is then available in the hardware catalog for further planning. Apart from standardized messages, the device master file possibly also contains specific/proprietary entries. A unique system message number is allocated to the respective events via the system message planning. The complete planning is loaded into the controller; and the message texts together with allocated system messages transmitted to a B&B system. Depending on the event, the field device transmits a corresponding diagnostic message to the automation equipment. In the cyclical program section, the automation equipment constantly checks whether system messages are present. Depending on the application, the allocated message number is transmitted to the B&B system and possibly linked with other events. The B&B system displays the allocated plain text message since the meaning of these message numbers is already known to the B&B system.

Network components are now similarly made known to the engineering via a corresponding device master file as a new class of field devices without I/O signals (and therefore not influencing the process). The mechanisms for field devices known in automation equipments are then also utilized for network components.

Standardization of the device master file for the network components is aimed for in a second stage.

Easy differentiation of the network status messages of the network components from messages of the field devices is enabled in an advantageous manner if the network components are allocated a device class diverging from the field device classes in accordance with the known allocation of classes for field devices within the communication mechanism. This enables simple selection and evaluation of the messages of the class of the network components from the set of system messages in the automation equipment.

If a network component is integrated within a field device, this has the advantage that the effort for implementation of an automation network is reduced.

The communication mechanism can be advantageously implemented in such a way that it complies with the PROFINET I/O standard and that the status messages of the network components are transmitted in an acyclic manner. The advantage of this is that no additional network load is created in the area of cyclic data transmission and that the cyclic transmission of process data is not influenced by the acyclic transmission of the status messages.

BRIEF DESCRIPTION OF THE DRAWINGS

In the following, the invention and also embodiments and advantages are explained in detail on the basis of the drawings in which an exemplary embodiment of the invention is represented. The diagrams show.

DETAILED DESCRIPTION OF THE INVENTION

Figure 1:
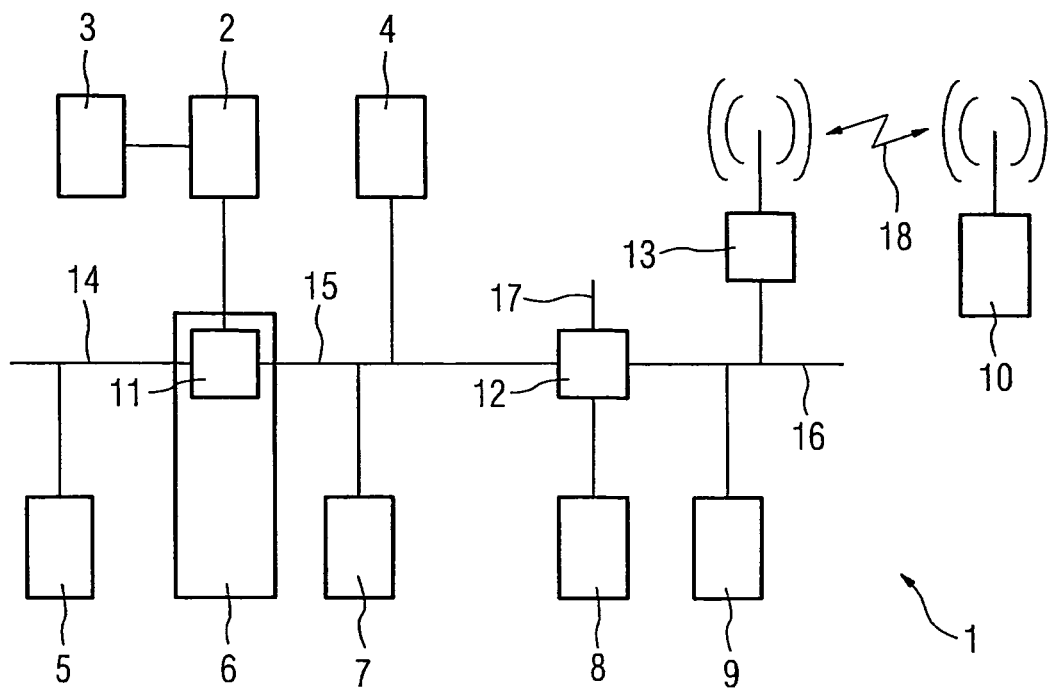
FIG. 1 An automation network,
FIG. 2 A structural diagram of a network component, and
FIG. 3 A structural diagram of an automation equipment

An automation network 1 comprises, as shown in FIG. 1, an automation equipment 2, a programming device 3 for planning the automation network 1, an operation and observation station 4 which forms the interface to a user, field devices 5, 6, 7, 8, 9, and 10 with which a process that has to be controlled, which is not represented in the figure for reasons of clarity, can be influenced, and also network components 11, 12, and 13 which are used to connect different segments of a data transmission network. The network component 11 is integrated within the field device 6. The automation equipment 2 is connected to one port of the network component 11, while the other two ports are connected to a network segment 14 and a network segment 15. The field device 8 is located at one port of the network component 12. Two further ports of the network component 12 are connected to the network segment 15 and a network segment 16. A fourth port 17 of the network component 12 is not occupied. The network component 13 is connected to the network segment 16 and is used as an Access Point, that is to say as a point of access for mobile field devices with data transmission via radio waves. With the aid of this network component 13, a radio link 18 exists for the mobile field device 10. The data transmission network is implemented on the basis of Ethernet and utilizes communication mechanisms as defined by PROFINET I/O. Process data is transmitted between the automation equipment 2 and the field devices 5 . . . 10 cyclically to ensure effective process communication. For messages of the network components 11, 12, and 13, which relate to fault statuses or warnings on the other hand, the acyclic area is utilized. A communication mechanism as defined by PROFINET I/O is also utilized for these messages, that is to say the same communication mechanism that is also used for field communication automation technology. These status messages are received and evaluated by the automation equipment 2. An example of status messages of this type comprises a Link Down, that is to say a port of a network component is no longer transmitting, for example because the cable for connecting the respective segment to the port has fallen off. A further example comprises the message from a network component that a redundant power supply has failed and therefore only one power supply is available for the continuing operation of the network component. Since the complete picture (process values and diagnostic status) of the process that has to be controlled and the data transmission network is constantly present in the automation equipment 2, the control program of the automation equipment can link the events from the process and the network to each other and react to fault statuses reported by the network components in a suitable manner. The network components 11, 12, and 13 are modeled as a separate class of field devices as defined by the PROFINET I/O standard. As a result, the process messages can be easily distinguished from status messages of the data transmission network. Changes in the process status and also the network status are displayed to a user on the operation and observation station 4. Detailed information about the data transmission network obtained directly from the network components 11, 12, and/or 13 can be displayed on the operation and observation station 4. On the basis of this detailed information, the user can decide how a possible fault status in one of the network components 11, 12 or 13 needs to be eliminated.

The planning of the automation network 1 can proceed as follows, for example.

The automation equipment 2 is planned by the programming device 3 as an engineering station, for example with STEP 7 software, and is given, among other things, its network address for the data transmission network. The automation equipment 2 then supplies all devices, that is to say the field devices 5 . . . 10 and also the network components 11, 12, and 13, which are assigned to the automation equipment 2 for the process that has to be controlled, which can be a subprocess of a larger one, with further data. The network components 11, 12, and 13 are therefore given their respective network address by the automation equipment 2 in the same way as the field devices 5 . . . 10. Furthermore, it is possible to define via the engineering which data of the network components 11, 12, and 13 is included in the system diagnostics.

Figure 2:
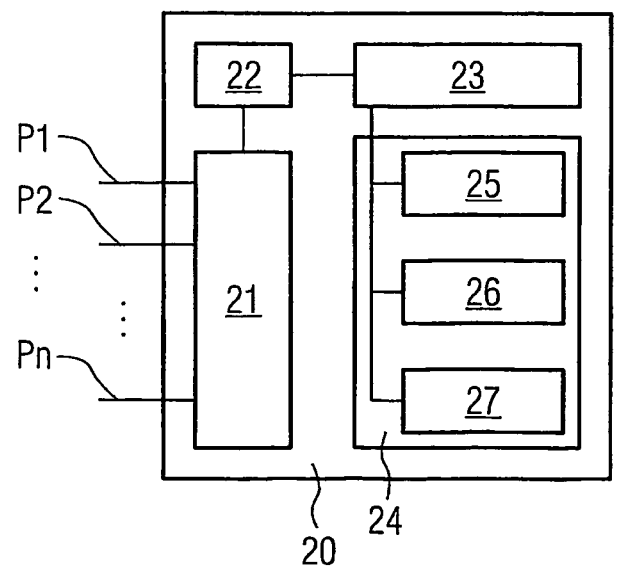

By way of example, FIG. 2 shows a structure of a network component 20 subdivided into function blocks, which is suitable for deployment in the automation network explained on the basis of FIG. 1. The network component 20 has n ports P1, P2 . . . Pn. These ports are connected to a Physical Layer module 21, which is activated by means of a switch ASIC 22. Furthermore, a CPU 23 with an operating program 24 is used for implementing the communication mechanisms. The operating program 24 implements, among other things, a so-called SNMP agent 25, a web server 26, and field device modeling 27.

An SNMP agent comprises a typical access to network components for network administrators. The network component 20 presents itself to the administrator via the SNMP agent 25, which permits higher-level network diagnostics. This is isolated from the diagnostics and control for the process that has to be controlled, however.

Web servers provide access to the diagnostics for individual devices. In the exemplary embodiment shown, the web server 26 is used for the diagnostics for the network component 20, which presents itself to a user with web interface via a browser. This type of diagnostics is also isolated from the diagnostics and control for the process.

By means of the field device modeling 27, the network component 20 presents itself to the user as the representative of a special class of field devices. The underlying communication mechanisms permit full incorporation of the diagnostics and control for the network component 20 in the process control and diagnostics, which is effected by the automation equipment 2 in the automation network 1 as shown in FIG. 1 described above.

Figure 3:
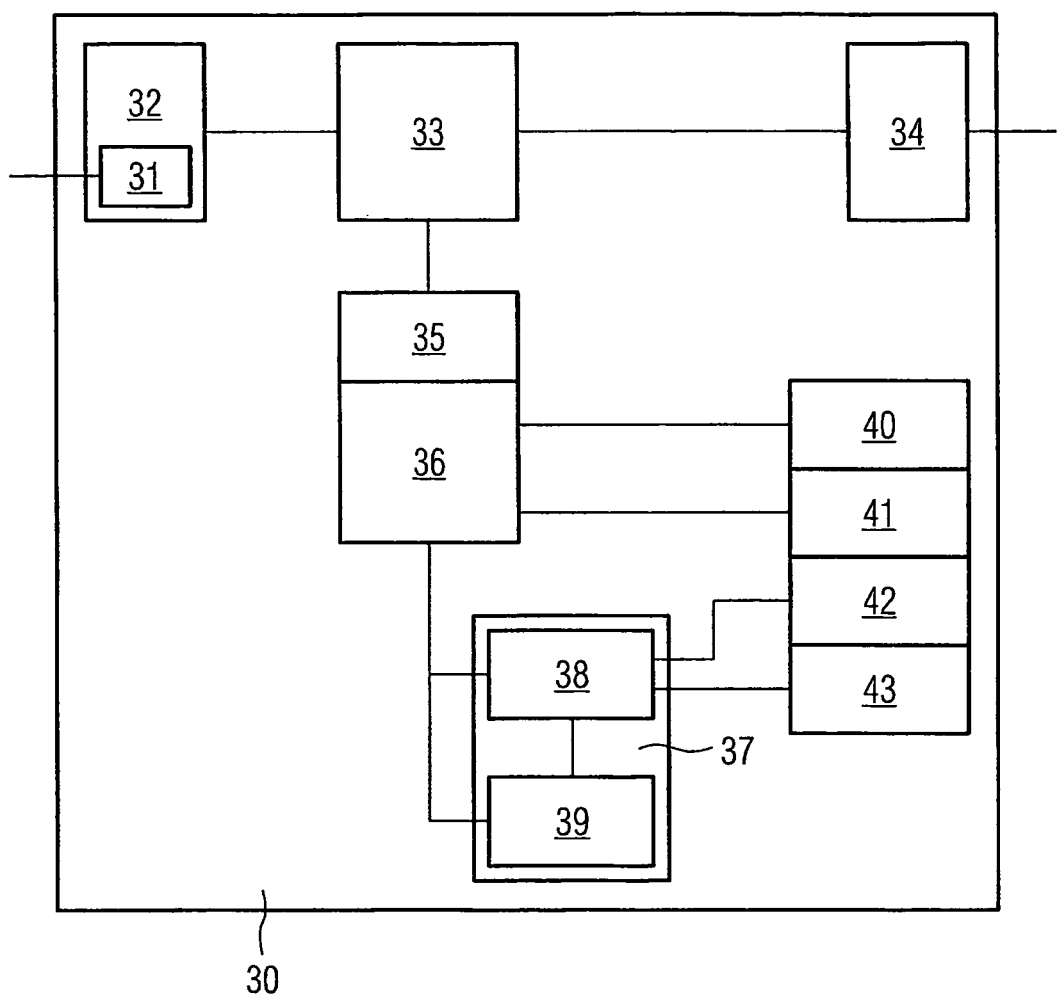

As shown in FIG. 3, an automation equipment 30 contains, for the purposes of communicating, a Physical Layer module 31, which forms part of a communication processor 32. The data that is transmitted or needs to be transmitted is exchanged by the communication processor 32 with a CPU 33. An interface 34 is used for connecting a programming device to the automation equipment 30. Alternatively, direct connection of a programming device to the network with full access to the automation equipment is also possible. An operating system 35 is used to operate the CPU 33. A sequencer 36 controls the running of a user program 37, which consists of a cyclic part 38, in which the user program 37 reacts on a process-specific basis, and an acyclic part 39 with event-controlled reaction. By means of the sequencer 36, a diagnostics status list 40 is continuously updated and messages are logged in a message buffer 41. The acyclic part 39 of the user program hands over data from the network components to the cyclic part 38 in order to allow a process-specific reaction to changes. The data from the field devices and the network components is stored in a memory 42 or in a memory 43 by the cyclic part 38. The two memories 42 and 43 can be understood to constitute logical sections in a larger memory area. A complete picture of the process and the network is therefore present in the automation equipment 30. Both the cyclic part 38 and also the acyclic part 39 of the user program 37 can generate messages, which are transmitted to an operation and observation station. In addition, the message buffer 41 and also the memories 42 and 43 can be read out by an operation and observation station. An engineering system, for example a programming device, can perform read access to the diagnostics status list 40 and the message buffer 41 for the purposes of evaluation. It is particularly clear from the illustrated structure of the automation equipment 30 that due to the immediate identification of events in the network, which takes place in the acyclic part 39 of the user program 37 in the illustrated exemplary embodiment, a direct and rapid reaction of the automation equipment 30, similar to a reaction to changes in the process status, is enabled.

The invention claimed is:

1. An automation network, comprising:
an automation equipment comprising a processor with an operating system and sequencer for running a user program that comprises a cyclic part providing process-specific operations and an acyclic part providing event-controlled operations, the automation equipment connected to a data transmission network having a communication mechanism that complies with the PROFINET I/O standard;
a plurality of field devices connected to the data transmission network for performing functions associated with a process and configured to transmit process messages between the plurality of field devices and the automation equipment cyclically, wherein all of the field devices are classified as a first device class defined by the PROFINET I/O standard via corresponding device master files;
a plurality of network components segmenting the data transmission network and connecting the plurality of field devices to the data transmission network, each of the plurality of network components comprising processor with an operating program for implementing Ethernet-based communication across the data transmission network, wherein all of the network components are classified as a second device class defined by the PROFINET I/O standard via corresponding device master files, wherein the second device class of the network components is configured as a special class of field devices distinct from the first device class of the field devices without input/output (I/O) signals that influence the process to enable differentiation of network component status messages from other system messages in the automation network based on device class, wherein the network components are configured to transmit network component status messages concerning network component status to the automation equipment acyclically.

2. The automation network as claimed in claim 1, wherein the automation equipment are configured to receive and evaluate system messages and differentiate network component status messages of the network components from process messages from the field devices based on device class.

3. The automation network as claimed in claim 1, wherein the plurality of field devices and the plurality of network components interconnect with the automation equipment and receive their respective network address from the automation equipment.

4. An automation system for an automation network, comprising:
   an engineering station connected to the automation network comprising automation equipment;
   a plurality of field devices connected to the automation network assigned to the engineering station for performing functions associated with a process and configured to transmit process messages between the plurality of field devices and the automation equipment cyclically, wherein all of the field devices are classified as a first device class defined by the PROFINET I/O standard via corresponding device master files; and
   a plurality of network components segmenting the data transmission network and assigned to the automation equipment connected to the automation network, each of the plurality of network components comprising processor with an operating program for implementing Ethernet-based communication across the data transmission network, wherein all of the network components are classified as a second device class defined by the PROFINET I/O standard via corresponding device master files, wherein the second device class of the network components is configured as a special class of field devices distinct from the first device class of the field devices without input/output (I/O) signals that influence the process to enable differentiation of network components' status messages from other system messages in the automation network based on device class, and
   wherein the automation equipment is configured to receive messages concerning the status of the network components that are transmitted acyclically to the automation equipment, evaluate the status messages, and monitor the operation of the automation network using the status messages.

5. An automation network, comprising:
   a plurality of network components configured for Ethernet-based communication across the data transmission network that complies with the PROFINET I/O standard;
   a plurality of automation equipment connected to the automation network via the network components, configured to receive and evaluate a plurality of status messages from the plurality of network components and monitor the operation of the automation network using the plurality of status messages;
   a plurality of field devices interconnected with the plurality of automation equipment via the plurality of network components that connect different segments of the data transmission network, the plurality of field devices for performing functions associated with a process and configured to transmit process messages between the plurality of field devices and the automation equipment cyclically, wherein all of the field devices are classified as a first device class defined by the PROFINET I/O standard via corresponding device master files;
   wherein all of the network components are classified as a second device class defined by the PROFINET I/O standard via corresponding device master files, wherein the second device class of the network components is configured as a special class of field devices distinct from the first device class of the field devices to enable differentiation of network component status messages from other system messages in the automation network based on device class; and
   wherein the network components are configured to transmit messages concerning their status to the automation equipment in an acyclic manner.

* * * * *